3,046,851
HIGHWAY MARKING COMPOSITION
Eduard R. de Vries, Huntingdon, Pa., assignor to Prismo Safety Corporation, Huntingdon, Pa., a corporation of Pennsylvania
No Drawing. Filed Nov. 24, 1958, Ser. No. 775,690
15 Claims. (Cl. 94—1.5)

This invention relates to highway marking materials adapted for marking pavements of roads, streets, highways, aircraft landing strips, and the like, for defining traffic lanes, pedestrian crosswalks, traffic instructions, and the like. More particularly, the present invention relates to a composition of matter and a process for utilizing it which is very rapidly curable to yield a non-tacky surface that can be subjected to traffic within a few minutes of application to the pavement.

In areas where traffic markings are subjected to heavy abrasive wear, the usual highway marking paints are not satisfactory because of the necessity for frequent replacement. Further, the usual highway marking paints require relatively long drying periods varying from 15 minutes to several hours. This interferes with the flow of traffic during replacement of the markings for excessively long periods. In the past, these difficulties have been partially met by the use of preformed marking devices which may be quickly applied to the pavement surface by means of suitable adhesives or other means and which are of sufficient thickness and durability to withstand long periods of abrasive wear. Such marking may be fairly rapidly applied, however, they do not lend themselves readily to the production of continuous stripes. Moreover, those which depend upon the use of adhesives are subject to displacement or loss due to the failure of the adhesives under the conditions of traffic and weathering.

The use of self adhesive plastic materials, which may be applied in thick continuous stripes, has been previously proposed; however, experience has shown that these materials retain a considerable degree of tackiness during the first few hours after their application, and do not adhere well to the pavement when subjected to traffic and weather conditions.

It is therefore an object of the present invention to provide a new traffic marking material which may be quickly applied as a continuous stripe and which becomes almost instantly cured to a hard surface and may be immediately subjected to traffic.

It is a further object of the present invention to provide an improved traffic marking material which may be continuously applied to a pavement by spraying and which instantly adheres to the pavement and which on application, becomes almost instantly free of surface tackiness.

It is a still further object of the present invention to provide an improved traffic marking material which may be quickly applied to a pavement with glass beads applied thereon and which, almost instantly, cures to a hard material retaining the glass beads in its upper surface even when subjected to traffic conditions.

Markings for pavements of roads, streets, highways, and the like, have unusual requirements not to be found in usual coating compositions. The markings must be durable and wear resistant, for long periods of time, to wear from traffic and to various environmental changes occasioned by the weather. The markings must be resistant to cracking and chipping, and must adhere satisfactorily to a wide variety of pavement material under traffic and climatic conditions. Application of the markings must be rapid, along with a rapid drying or curing of the markings. It is important that traffic not be delayed unduly while such markings are applied and cured.

In accordance with the present invention, a traffic marking material which meets the objects of this invention can be prepared by admixing a polyester resin containing a reactive unsaturated monomer, and an epoxy resin, with pigments, extenders, a catalyst for the polyester resin, an accelerator for the polyester resin and a curing agent for the epoxy resin. The resulting marking material has been found to have exceptional adhesion to the pavement, abrasion resistance, low curing time, and a remarkable adhesion to glass beads.

The use of polyester resin compositions as binders in traffic paints has been previously proposed, however, many shortcomings have been found in the use of such traffic paints. Such paints have shown a lack of abrasion resistance, a brittleness resulting in cracking under impact, and a lack of adhesion to pavement surfaces.

Unexpectedly, it has been discovered that the addition of the epoxy resin to the polyester resin composition with a simultaneous curing acts to overcome the shortcomings found in either the polyester resin composition alone or in the epoxy resin alone as the binder.

The main advantage of the polyester resin composition as a binder for traffic paints is its quick curing time. The main disadvantage of the epoxy resin as a binder for traffic paints is its slow curing time requiring from ½ hour to several days for complete curing to permit the passage of traffic. It has now been found that with the combination of ingredients in accordance with the present invention that the curing time has been reduced to 30 seconds to 10 minutes. It would be expected by one skilled in the art that the addition of the epoxy resin to the polyester resin composition would increase the curing time of the polyester resin composition; however, it has now been found that the same quick curing time as with the polyester resin composition alone can be obtained using this mixture of resins.

Thus, utilizing the principles of this invention, a traffic paint is obtained which gives the advantageous properties of the epoxy resin, such as good adhesion and durability, as well as the advantageous properties of the polyester resin composition, such as quick curing time.

To prove this, two sets of samples of traffic point containing the same pigmentation but with different binders were applied to concrete slabs and submitted to accelerated weathering tests using a weatherometer. The samples containing a polyester resin composition alone as the binder in the traffic paint lasted in the weatherometer test from 100 to 300 hours until failure of the coating. The samples containing the polyester resin composition admixed with epoxy resin as the binder lasted in the weatherometer test from 500 to 2,000 hours without failure. This test demonstrates the tremendous increase in durability given to the marker utilizing the compositions of the present invention over previously suggested compositions.

The failures noted with the samples containing the polyester resin composition alone were cracking, chipping and general loss of adhesion. The addition of the epoxy resin results in a composition having a lower shrinkage during curing, thus establishing a firmer bond, coupled with the better adhesion of epoxy resins. This lower shrinkage substantially reduces the strain occurring during and after curing, especially under the influence of atmospheric humidity, temperature changes, and the like. It is known that plasticizers, such as dibutylphthalate, act to soften polyester resins. However, after curing, these monomeric plasticizers, which do not take part in the polymerization reaction, are lost by slow volatilization during exposure to atmospheric conditions, thus further increasing slow strain in the film leading to cracking. The epoxy resins, apart from enhancing adhesion in their own right, will evidently also serve as polymeric plasticizers for the cured polyester resin.

The weatherometer exposure indicated heretofore was in accordance with A.S.T.M procedures except that a freezing cycle of two hours out of every twenty-four hours was added, in order to introduce higher temperature differentials and more severe strains.

Traffic paints in accordance with this invention contain the following proportions of ingredients:

| | Percent by weight |
|---|---|
| Binder | 40-95. |
| Extenders and pigments | 5-60. |
| Catalyst for the polyester resin composition | 1-10 (based on the weight of the polyester resin present in the formulation). |
| Accelerator for the polyester resin composition | 0.1-5 (based on the weight of the polyester resin present in the formulation). |
| Curing agent for the epoxy resin | 1-10 (based on the weight of the epoxy present in the formulation). |

It should be noted that the optimum percentage of pigmentation is from 40-60% by weight of the composition.

The binder is a combination of a polyester resin composition and an epoxy resin in the following proportions:

| | Percent by weight |
|---|---|
| Polyester resin composition (containing the unsaturated monomer) | 60-98 |
| Epoxy resin | 2-40 |

It should be understood that small glass spheres having a diameter up to 13 mils can be incorporated in these formulae as a premix at a ratio of up to 8 lbs. of spheres per gallon of paint. It is further contemplated that glass spheres of 5 to 40 mils in diameter can be distributed onto the surface of the marker before the material has cured. When the material has cured, the glass beads are retained in partially embedded state on the surface of the marker to yield a high auto-collimating efficiency to the marker.

Rapidly curing liquid polyester resin compositions of a nature suitable for use in these formulations are known. In general, suitable polyester resin compositions comprise a polyester resin and a monomeric polymerizable material that does not give off volatile matter during curing. The suitable polyester compositions are those that are commonly classed as "cold cured" polyester compositions that cure in less than 10 minutes in the presence of a suitable catalyst and accelerator without the necessity of an application of pressure of an external source of heat.

Polyester resins are a class of resins, which is well known to those skilled in the art. In general, polyester resins are unsaturated alkyd resins formed by the reaction of one or more dicarboxylic acid components and one or more polyhydric alcohols. Illustrative of the dicarboxylic acid components are the saturated components phthalic anhydride and adipic and azelaic acids, and the unsaturated components, fumaric acid and maleic acid. Illustrative of the dihydric alcohols most commonly used are glycols of ethylene, propylene, 1,3- and 2,3-butylene diethylene and dipropylene. An unsaturated monohydric alcohol, such as allyl alcohol, may be used in place of part of the polyhydric alcohol. One or more of the acid components or polyhydric alcohols should contain a reactive double bond or ethylenic linkage. It is essential that one of the components of the polyester resins contain an unsaturated ethylenic linkage. The polyester reaction products are mixed with a non-volatile unsaturated monomeric cross-linking agent for the polyester resin. Illustrative of the monomeric agents are the unsaturated hydrocarbons, such as styrene, vinyl toluene, vinyl acetate, methyl methacrylate, alpha and para methyl styrene, divinyl benzene, ethyl acrylate, acrylonitrile, diallyl esters, cyclo pentadiene, triallyl cyanurate and many others. The monomeric agent serves to make the polyester resin more fluid and also to cross-link the resin at the time of curing to produce a cross-linked or three dimensional polyester resin, which is thermosetting in character. The monomeric agent is of a nature that it is consumed during the curing of the resin without forming volatile materials.

The properties of the polyester resin compositions can be modified through the use of various dibasic acids, different glycols, and several monomers, each in varying ratio to the others, permitting preparation of end products with almost any desired properties. These polyester resin compositions are mobile liquids and can be converted quickly to solids. They are 100% reactive and evolve no gas or liquid during curing. A specific example of a suitable polyester resin composition found suitable is the reaction product of—

| | Lbs. |
|---|---|
| Propylene glycol | 974 |
| Phthalic anhydride | 888 |
| Maleic anhydride | 588 |

Approximately 2200 lbs. of unsaturated polyester reaction product is obtained to which is added 1083 lbs. styrene, or a ratio of 2 parts reaction product to one part styrene.

Expressed in mol percent, approximately 5 to 50% of reactive monomer can be added, and the mol percent of glycol is usually greater than the combined mol percents of the acids used.

The epoxy resins employed in accordance with the present invention are commonly referred to as poly glycidyl ethers of polyhydric alcohols and glycidyl ethers of bisphenols, characterized by the following general formula:

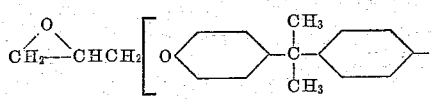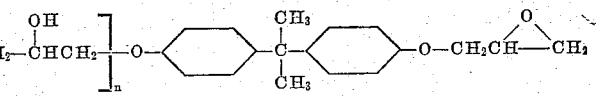

wherein $n$ represents the extent of copolymerization and varies between 0 and 10 indicating molecular weights of 400 to approximately 8000. These products contain both epoxide and hydroxyl groups capable of further reaction. It is the combination of these groups with the curing agent that results in the cured resin systems. Various amines, such as ethylene diamine, triethylene tetramine, dimethyl amino methyl phenol, tri (dimethyl amino methyl) phenol, diamino diphenyl sulfone, metapheylene diamine, and diethyl aminopropylamine, acid anhydrides, organic sulfonic acids, dibasic acids and resins, such as polyamides, are typical curing agents.

The epoxy resins are commercially sold by Shell Chemical Corp. under the tradenames of Epons. Epon 828, for example, has a melting point of 8-12° and an epoxide equivalent ranging between 190-210. By the epoxide equivalency is meant the average number of 1,2-epoxy groups contained in the average molecule. It is expressed in the trade as the grams of the polymeric material or resin containing one gram equivalent of epoxide.

It should be understood that the epoxy resins suitable for use in this invention are not limited to those described above. Any resinous material containing reactive epoxy groups whether aliphatic or aromatic, may be used so long as the material will cure in the presence of curing agents to a solid condition. For example, a dicyclo-diepoxy carboxylate resin may be used which is sold by Union Carbide and Carbon Co. as Epoxide 201.

The pigment is added to the formulation to impart reflection to the marker as well as color and opacity, and the extenders impart structural strength to the film. To produce a white marker, it is necesary to have a prime pigment, such as rutile titanium dioxide, to furnish the necessary whiteness and opacity. In place of the rutile titanium dioxide, anatase titanium dioxide may be substituted. Other pigments that may be used for white and colored markers are as follows: aluminum oxide, iron oxide, silicon carbide, antimony oxides, lead oxide, lead chromates, zinc chromates, cadmium pigments, siennas, umbers, inorganic or organic reds, chrome yellows, chrome oranges, chrome greens, etc. The pigments can be extended with barium sulphate, calcium sulphate, magnesium silicate, zinc oxides, zinc sulphide, normal or high strength lithopones, diatomaceous silica, amorphous and crystalline silica, micaceous materials, barium sulphate, whiting, wollastonite pumices, calcium carbonate, clay, talc, perlite, asbestos, granular marble, sand, glass beads, and other natural or manufactured granular materials.

Suitable catalysts which are added to the formulation to cure the polyester resin composition include a large number of oxidizing catalysts such as lucidol benzoyl peroxide, di-t-butyl peroxide, cumene hydro-peroxide, methyl ethyl ketone peroxide, benzoyl peroxide, etc. with which those skilled in the art are familiar. For rapidly curing polyester compositions, the catalyst at least in part is benzoyl peroxide or methyl ethyl ketone peroxide.

The accelerators for the polyester composition act to impart glossiness, to minimize stickiness of the material and primarily to decrease the time necessary for gelation or cure of the resin. Illustrative of the most important accelerators are the cobalt, manganese, vanadium, calcium and iron soaps of organic acids, such as the naphthenates, dimethylaniline, and mixtures of dimethylaniline with triethylene tetramine or ethylene diamine.

The following specific examples of formulations in accordance with this invention are illustrative only and should not be construed as limiting the scope of the invention:

*Example 1*

| | Parts |
|---|---|
| Polyester resin composition | 100 |
| Epoxy resin | 10 |
| Vinyl toluene | 5 |
| Pigments and extenders | 45 |
| Benzoyl peroxide (1:1 in isopropyl alcohol) | 10 |
| Dimethylaniline | 1 |
| Triethylene tetramine | 1 |

A mixture of the polyester resin composition, epoxy resin, vinyl toluene, pigments and extenders is made in the usual manner. Immediately prior to use, the benzoyl peroxide catalyst is added to the mixture and the material is placed in the supply container of a line striping machine. The amines are sprayed from a separate gun in the machine. Thus, the pigmented binder is sprayed from the machine and is admixed with the amines immediately after leaving the gun. Glass beads can be spread on the surface of the pigmented binder before the curing is complete. The gel time for this formulation was 25 seconds. The line was traffic dry in 90 seconds, and was nail hard in 2½ minutes.

The above composition is a three-part system. The binder, pigments and extenders, and vinyl toluene are shipped in one container, the catalyst is shipper in a second container, and the curing agent and accelerator in a third container. Although the catalyst may be added to the binder material before the spraying takes place, since the pot life with the catalyst is several hours, it should be understood that the curing agent and accelerator must not be added until such time that the material will be sprayed since the curing reaction takes place immediately.

Although the triethylene tetramine or similar amine is primarily a curing agent for the epoxy resin, it has been found that the combination of the triethylene tetramine or similar amine and dimethyl amiline acts synergetically to affect the rapid cure of the binder.

The particular polyester resin composition utilized in Example 1 was a mixture of 50 parts Paraplex P-444 and 50 parts Selectron 5003. The Paraplex P-444 is sold by Rohm & Haas Company and is a solution of an unsaturated polyester dissolved in methyl methacrylate as the cross-linking agent. The ratio of unsaturated polyester to monomer is 3:1. The Selectron 5003 is an unsaturated polyester composition sold by Pittsburgh Plate Glass Corporation.

The epoxy resin used was Epon 828 sold by Shell Chemical Corporation.

*Example 2*

| | Parts |
|---|---|
| Polyester resin composition | 100 |
| Epoxy resin | 10 |
| Wollastonite (calcium silicate) | 32 |
| Titanox (white pigment) | 16 |
| Bentone (anti-settling agent) | 1 |
| Benzoyl peroxide (1:1 in isopropyl alcohol) | 10 |
| Dimethyl aniline | 1 |
| Triethylene tetramine | 1 |
| Toluene | 5 |

The amines were dissolved in the toluene and added to a mixture of the remaining ingredients. The resulting material had a gel time of 24 seconds and was traffic dry in 2-3 minutes.

*Example 3*

The same formulation as Example 2 except that 20 parts of epoxy resin were used.

*Example 4*

The same formulation as Example 2 except that 30 parts of epoxy resin were used.

*Example 5*

The same formulation as Example 2 except that 40 parts of epoxy resin were used.

*Example 6*

| | Parts |
|---|---|
| Polyester resin composition | 100 |
| Epoxy resin | 20 |
| Titanox | 13 |
| Wollastonite | 30 |
| Whiting | 3 |
| Asbestine | 1 |
| Dibutyl phthalate | 5 |
| Benzoyl peroxide (1:1 in isopropyl alcohol) | 10 |
| Dimethyl aniline | 1 |
| Ethylene diamine | 3 |
| Toluol | 6 |

*Example 7*

| | Parts |
|---|---|
| Polyester resin composition | 88 |
| Epoxy resin | 10 |
| Vinyl toluene | 6 |
| Wollastonite | 88 |
| Titanox | 15 |
| Bentone | 1 |
| Benzoyl peroxide (1:1 in isopropyl alcohol) | 10 |
| Dimethyl aniline | 1 |
| Triethylene tetramine | 1 |
| Toluene | 3 |

The gel time was 40 seconds. The line was traffic dry in 90 seconds, and was nail hard in 3½ minutes.

The vinyl toluene shown in certain of the examples acts to adjust the viscosity of the mixture; however, unlike the solvents in conventional paints, the vinyl toluene copolymerizes with the unsaturated polyester resin and remains in the formulation even after curing.

The bentone acts as an anti-settling agent. Aluminum sterate may be substituted for the bentone, if desired, the anti-settling agent to be used in amounts of 1–5 lbs. per 100 gallons of finished material.

Utilizing formulations as described herein, it is possible to apply the lane lines on roads in heavily traveled areas without substantial delay to the passage of traffic. Liquid spray apparatus for road striping equipped with two nozzles may be utilized to spray the two materials, with provision made to have the sprays from the two nozzles meeting near or at the point of deposition of the admixture. A movable vehicle, having mounted thereon two spraying devices, each with a supply tank and spray nozzle, provides a convenient and suitable application means for the sprays. Reflectionization unit dispensers, which are used to deposit reflectorization units, such as glass beads, immediately after deposition of the marking, can be used to dispense the beads.

The process of the invention comprises intermixing two compositions, the first containing the polyester resin composition, the epoxy resin, pigments, extenders and the catalyst, and the second containing the accelerator for the polyester resin composition and the curing agent for the epoxy resin. When the two compositions are mixed, the mixture cures to a hard infusible state in a few minutes. The mixture is applied to the pavement of a road, street, highway or the like prior to the curing to the hard, infusible state. If reflectorization is desired, glass beads are applied to the upper surface of the marking prior to the curing.

It will be obvious to those skilled in the art that various changes may be made without departing from the spirit of the invention and therefore the invention is not limited to what is described in the specification, but only as indicated in the appended claims.

What is claimed is:

1. A highway marking composition consisting essentially of a mixture of 40–95% by weight of a binder containing 5–60% by weight pigments and extenders therein, said binder comprising a mixture of 60–98% by weight of at least one polyester resin composition, and 2–40% by weight of an epoxy resin, polymerization catalyst for said polyester resin composition, accelerator for said polyester resin composition and a curing agent for said epoxy resin, said polyester resin composition comprising the reaction product of at least one dicarboxylic acid and at least one polyhydric alcohol wherein at least one acid or alcohol component contains a reactive double bond, in admixture with a vinylidene monomer copolymerizable therewith, said epoxy resin comprising at least one resinous material containing reactive epoxy groups curable by said curing agent to a solid state, said mixture having a gel time of less than a minute and curing to a traffic dry condition within several minutes after addition of said accelerator and said curing agent.

2. A highway marking composition in accordance with claim 1 wherein said polymerization catalyst is benzoyl peroxide, said accelerator is dimethyl aniline and said curing agent is selected from the group consisting of triethylene tetramine and ethylene diamine.

3. A highway marking composition in accordance with claim 1 wherein said polymerization catalyst is in the amount of 1–10% by weight of the polyester resin, said accelerator is 0.1–5% by weight of said polyester resin, and said curing agent is 1–20% by weight of the epoxy resin.

4. A highway marking composition in accordance with claim 2 wherein said polymerization catalyst is in the amount of 1–10% by weight of the polyester resin, said accelerator is 0.1–5% by weight of said polyester resin, and said curing agent is 1–20% by weight of the epoxy resin.

5. A highway marking composition in accordance with claim 1 wherein said marking composition contains up to 8 lbs. per gallon of the marking composition of small glass spheres having a diameter up to 13 mils.

6. A combined highway and surface marker comprising a road adapted to receive automotive traffic, the upper surface of which is coated with a pigmented composition, said composition including a binder containing pigments and extenders therein, said binder comprising a mixture of 60–98% by weight of at least one polyester resin composition and 2–40% by weight of an epoxy resin, said mixture of resins being cured by the combination of a polymerization catalyst and accelerator for said polyester resin composition and a curing agent for said epoxy resin, said polyester resin composition comprising the reaction product of at least one dicarboxylic acid and at least one polyhydric alcohol wherein at least one acid or alcohol component contains a reactive double bond, in admixture with a vinylidene monomer copolymerizable therewith, said epoxy resin comprising at least one resinous material containing reactive epoxy groups curable by said curing agent to a solid state, said mixture having a gel time of less than a minute and curing to a traffic dry condition within several minutes after addition of said accelerator and said curing agent.

7. A combined highway and surface marker in accordance with claim 6 wherein said polymerization catalyst is benzoyl peroxide, said accelerator is dimethyl aniline and said curing agent is selected from the group consisting of triethylene tetramine and ethylene diamine.

8. A combined highway and surface marker in accordance with claim 6 wherein said binder comprises 40–95% by weight of said pigmented composition and said pigments and extenders comprise 5–60% by weight of said pigmented composition.

9. A combined highway and surface marker in accordance with claim 8 wherein said polymerization catalyst is benzoyl peroxide, said accelerator is dimethyl aniline and said curing agent is selected from the group consisting of triethylene tetramine and ethylene diamine.

10. A combined highway and surface marker in accordance with claim 8 wherein said polymerization catalyst is in the amount of 1–10% by weight of the polyester resin, said accelerator is 0.1–5% by weight of said polyester resin, and said curing agent is 1–20% by weight of the epoxy resin.

11. A combined highway and surface marker in accordance with claim 9 wherein said polymerization catalyst is in the amount of 1–10% by weight of the polyester resin, said accelerator is 0.1–5% by weight of said polyester resin, and said curing agent is 1–20% by weight of the epoxy resin.

12. A combined highway and surface marker in accordance with claim 6 wherein said marking composition contains up to 8 lbs. per gallon of the marking composition of small glass spheres having a diameter up to 13 mils.

13. A combined highway and surface marker in accordance with claim 6 wherein a plurality of small glass spheres having a diameter of 5–40 mils are partially embedded in the upper surface of said marker.

14. A highway marking composition essentially comprising a mixture of 100 parts by weight of at least one polyester resin composition, 10–40 parts by weight of an epoxy resin, 5–240 parts by weight pigments and extenders, 1–10 parts by weight benzoyl peroxide, 0.1–5 parts by weight dimethylaniline, and 0.1–8 parts by weight of a curing agent selected from the group consisting of triethylenetetramine and ethylene diamine, said polyester resin composition comprising the reaction product of at least one dicarboxylic acid and at least one polyhydric alcohol wherein at least one acid or alcohol component contains a reactive double bond, in admixture with a vinylidene monomer copolymerizable therewith, said epoxy resin comprising at least one resinous material containing reactive epoxy groups curable by said curing agent to a solid state, said mixture having a gel time of less than a minute and curing to a traffic dry condition within several minutes after addition of said accelerator and said curing agent.

15. A method of making a traffic marker which comprises applying a layer of a liquid reflecting pigmented composition to a road surface adapted to receive automotive traffic, said composition consisting substantially entirely of a mixture of 5–60% by weight of pigments and extenders, and 40–95% by weight of a binder, said binder comprising a mixture of 60–98% by weight of polyester resin composition, 2–40% of an epoxy resin, 1–10% by weight of said polyester resin of a polymerization catalyst for said polyester resin, 0.1–5% by weight of the polyester resin of an accelerator for said polyester resin and 1–20% by weight of the epoxy resin of a curing agent for said epoxy resin, said polyester resin composition comprising the reaction product of at least one dicarboxylic acid and at least one polyhydric alcohol wherein at least one acid or alcohol component contains a reactive double bond, in admixture with a vinylidene monomer copolymerizable therewith, said epoxy resin comprising at least one resinous material containing reactive epoxy groups curable by said curing agent to a solid state, adding said accelerator and said curing agent to the remainder of the composition immediately prior to the composition reaching said road surface whereby said polyester resin and said epoxy resin are catalyzed and cured on said road surface to form a thermoset solid incorporating said pigment and extenders which is adherent to said road surface and resistant to the abrasion of traffic.

References Cited in the file of this patent

UNITED STATES PATENTS

| | | |
|---|---|---|
| 2,574,971 | Heltzer | Nov. 13, 1951 |
| 2,824,502 | Rockwell et al. | Feb. 25, 1958 |
| 2,865,266 | Wynn | Dec. 23, 1958 |
| 2,897,733 | Shuger | Aug. 4, 1959 |

FOREIGN PATENTS

| | | |
|---|---|---|
| 735,531 | Great Britain | Aug. 24, 1955 |